United States Patent [19]
Aldebert et al.

[11] Patent Number: 5,794,033
[45] Date of Patent: Aug. 11, 1998

[54] METHOD AND SYSTEM FOR IN-SITE AND ON-LINE REPROGRAMMING OF HARDWARE LOGICS WITH REMOTE LOADING IN A NETWORK DEVICE

[75] Inventors: Jeane-Paul Aldebert, Vence; Claude Basso, Nice; Jean Calvignac, La Gaude; Paul Chemla, Antibes; Daniel Orsatti, Cagnes Sur Mer; Fabrice Verplanken, La Gaude; Jean-Claude Zunino, Nice, all of France

[73] Assignee: International Business Machines Corporation, Armonk, N.Y.

[21] Appl. No.: 547,635

[22] Filed: Oct. 24, 1995

[51] Int. Cl.⁶ .......................... G06F 13/38; H03K 19/177
[52] U.S. Cl. .......................... 395/653; 711/103; 326/39; 340/825.83; 364/716.03; 365/185.33; 365/189.08; 395/598; 395/821
[58] Field of Search .......................... 326/38, 39, 8; 365/185.22, 185.33, 189.08; 711/103; 340/825.83; 364/716.03; 395/598, 821, 651, 653

[56] References Cited

U.S. PATENT DOCUMENTS

| | | | |
|---|---|---|---|
| 4,879,688 | 11/1989 | Turner et al. | 365/185.22 |
| 5,148,527 | 9/1992 | Basso et al. | 395/309 |
| 5,426,378 | 6/1995 | Ong | 326/39 |
| 5,426,379 | 6/1995 | Trimberger | 326/39 |
| 5,670,897 | 9/1997 | Kean | 326/41 |
| 5,705,938 | 1/1998 | Kean | 326/39 |

*Primary Examiner*—Eddie P. Chan
*Assistant Examiner*—Hong Kim
*Attorney, Agent, or Firm*—Jeanine S. Ray-Yarletts

[57] ABSTRACT

The invention discloses a method and an apparatus for in-line and on-site updating of Field Programmable Gate Arrays with remote loaded configuration data files. Flash EEPROMs which are used because of their non-volatile memories and their high density, are storing more than one configuration data file. The memories are divided in more than one part, each part of the memory for storing one configuration data file. One part of the memory also contains a flag identifying the currently loaded configuration data file. The Flash EPROM's bits being set to one same binary value before any writing operation, including the update of the configuration data file containing the flag. The setting of the bits to said binary value always identifies a valid other configuration data file in order to insure a correct re-loading of the FPGAs in case of reception of an unexpected event leading to an initialization.

13 Claims, 11 Drawing Sheets

MASTER SERIAL MODE/PRIOR ART

SLAVE SERIALMODE/PRIOR ART

MASTER PARALLEL MODE/PRIOR ART

SLAVE PARALLEL MODE/PRIOR ART

ASYNCHRONOUS PERIPHERAL MODE/PRIOR ART

FLASH ACCESS MODES OF OPERATION

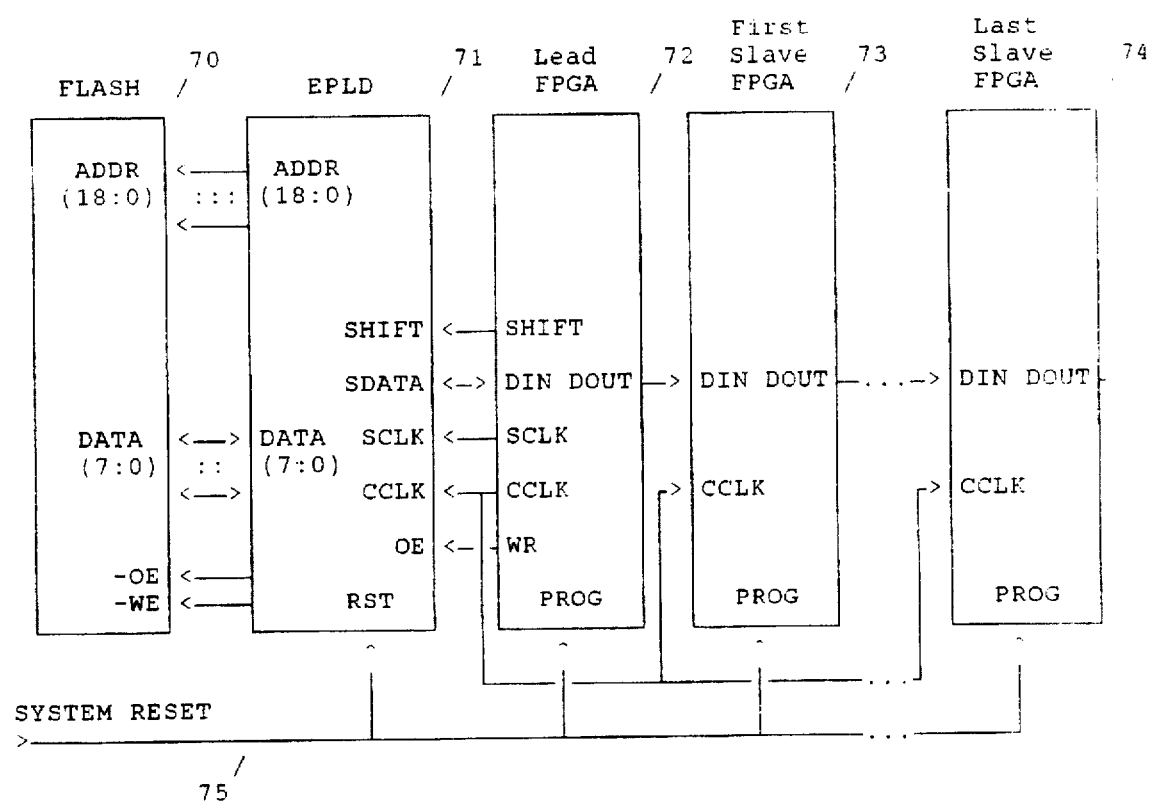
Fig. 7 CONFIGURATION LOGIC

SECTORED FLASH MEMORY AREA

FLASH MEMORY MAP

METHOD AND SYSTEM FOR IN-SITE AND ON-LINE REPROGRAMMING OF HARDWARE LOGICS WITH REMOTE LOADING IN A NETWORK DEVICE

The present invention relates to data communications in general and more particularly a method and device allowing in-site and on-line reprogramming of a programmable hardware logic used in network devices.

BACKGROUND OF THE INVENTION

The present invention relates to programmable hardware logic used for functional implementation in networking equipment and more particularly in switching nodes.

In networking devices the choice of a type of hardware implementation of function has a direct impact on performance, costs and usability. These three aspects are considered hereunder to evaluate the background art.

In systems employing regular integrated circuits (ASICs, Application Specific Integrated Circuits) the hardware functions are permanently defined inside logic modules such as gate arrays. There is no way to modify the hardware functions except by replacing integrated circuits. This presents a very limiting constraint in applications subject to functional changes because it is not practical for most customers to perform such operations on their machines.

Alternatively, systems may employ Field Programmable Gate Arrays ("FPGAS"). With this technology, the hardware functions can be updated without changing the integrated circuits. Such updates are achieved by changing the FPGA configuration data stored in non-volatile memory. This memory must be non-volatile to retain the personalized data when the system is powered off.

In many systems these updates are done by physically changing the memory modules. This is a more convenient approach than with the previous systems because it is generally done by changing one or several socket-mounted memory modules, instead of replacing the entire hardware function.

In other systems the update is performed by refreshing the content of the memory which is, in this case, a writable device such as EEPROMs (Electrically Erasable Programmable Read Only Memory). Such products found in the industry perform that refresh via local and dedicated hardware and software resources. Examples of such products are hardware logic simulators consisting of a plurality of FPGAs which are personalized by a dedicated control path driven by software, this path remaining unused when performing the functional simulation tasks.

This is a more convenient method than the previous one from the usability point of view since it does not require manual intervention on the system hardware. However, it requires the implementation of hardware resources which are dedicated to such updates and are added on top of the resources necessary for operating the main functional part of the system.

More detailed information about existing modes of loading the FPGA with configuration data are provided hereunder. These modes apply particularly to FPGAs as described in the publication of XILINX, inc., 1994, 'The programmable logic data book', second edition.

FIG. 1 illustrates the implementation of the Master Serial Mode of loading the FPGA with configuration data. It is the most frequently used mode. It employs one or more serial PROMS which are accessed serially for address and data. As for all other modes described hereafter, several FPGAs can be configured from the same set of PROMs. In this Master Serial Mode, the "Lead FPGA" generates control signals to drive the PROMs and it propagates the serial data to the "Slave FPGAs" connected in daisy chain mode. The CCLK signal 14 is the configuration clock generated by the Lead FPGA 11, used by the serial PROM 10 to send the configuration data to the DIN input of the Lead FPGA 11. The Serial PROM 10 can be made of a single module or several cascaded modules. The Lead FPGA 11 also gives the CCLK clock 14 to the Slave FPGAs 12, 13 (and all Slave FPGAs not represented on the figure), and forwards configuration data to the DIN input of the first Slave FPGA 12 via its DOUT output. The same principle is used to forward configuration data from the first Slave FPGA 12 to the second Slave FPGA 13, and so on until the end of the daisy chain (not expressly represented in the FIG. 1).

FIG. 2 represents one implementation of the Slave Serial Mode. This mode is similar to the previous one, but the originator of signals controlling the serial PROMs, such as CCLK, is not an FPGA; it is a piece of external logic often found in the form of a microcontroller driving the signals through its IO port. The CCLK signal 24 is the configuration clock generated by the microcontroller 20 to the CCLK pin of the Lead FPGA 21. The CCLK signal 24 is also given to the Slave FPGAs 22, 23 (and all Slave FPGAs not expressly represented in the figure). Microcontroller 20 sends configuration data to the DIN pin of the Lead FPGA 21. The Lead FPGA 21 forwards configuration data to the DIN input of the first Slave FPGA 22 via its DOUT output. The same principle is used to forward configuration data from first Slave FPGA 22 to second Slave FPGA 23, and so on until the end of the daisy chain (not represented in the figure).

FIG. 3 depicts the Master Parallel Mode. This mode uses a Lead FPGA accessing a regular EPROM (or PROM or ROM or EEPROM) via parallel address and data buses. The CCLK signal 34 is the configuration clock generated by the Lead FPGA 31. Every eighth CCLK clock cycle, the Lead FPGA 31 presents a parallel address to the Memory 30. This memory can be a single or multiple ROM, PROM, EPROM or EEPROM. In return, the Memory 30 sends a configuration data byte to the Lead FPGA 30 (pins D7 to D0). The Lead FPGA also gives the CCLK clock 34 to the Slave FPGAs 32, 33 (and all Slave FPGAs not represented on the figure), and forwards configuration data to the DIN input of the first Slave FPGA 32 via its DOUT output. The same principle is used to forward configuration data from first Slave FPGA 32 to second Slave FPGA 33, and so on until the end of the daisy chain (not represented in the figure).

FIG. 4 depicts the Slave Parallel Mode; this mode is based on byte transfers from external logic to the Lead FPGA under the control of an externally generated control signal (CLK) It is a synchronous mode because the external logic defines the timing that the FPGAs must follow. The external logic is generally implemented via a microcontroller. The CLK signal 44 is the configuration clock of the microcontroller 40. It provides the clock to the parallel data sent from the DATA pins of the microcontroller 40 to the D7–D0 pins of the Lead FPGA 41. The CLK signal 44 is also given to the Slave FPGAs 42, 43 (and all Slave FPGAs not represented on the figure). The Lead FPGA 41 forwards configuration data to the DIN input of the first Slave FPGA 42 via its DOUT output. The same principle is used to forward configuration data from the first Slave FPGA 42 to the second Slave FPGA 43, and so on until the end of the daisy chain (not represented in the figure).

FIG. 5 illustrates the Asynchronous Peripheral mode. This mode is similar to the previous one, the main difference being that there is handshaking added to pace the external logic by the FPGAs being configured (implemented through the "+READY/-BUSY" signal driven by the Lead FPGA to the external logic). Also, the basic clocking is done via an address decode logic driving the "CS0" input of the Lead FPGA. The CCLK signal 54 is the configuration clock generated by the Lead FPGA 51. The Lead FPGA 51 lets the microcontroller 50 send the next configuration data byte by asserting its RDY line. In response, the microcontroller 50 sends the next configuration data byte to the pins D7–D0 of the Lead FPGA 51 and signals it by asserting its CS0 input. The Lead FPGA 51 also gives the CCLK 54 to the Slave FPGAs 52, 53 (and all Slave FPGAs not represented on the figure), and forwards configuration data to the DIN input of the first Slave FPGA 52 via its DOUT output. The same principle is used to forward configuration data from first Slave FPGA 52 to second Slave FPGA 53, and so on until the end of the daisy chain (not represented in the figure).

The AMD (Advanced Micro Device) publication "Flash Memory Products, 1994/1995 Data Book/Handbook" describes the family of AMD's Flash memory device offering specially used for microprocessor based products characterized by their high density and access at the byte level.

Taking into account the knowledge of prior art, it is an object of the present invention to provide a mode of reprogramming of FPGAs with new configuration data in a network device such as a switching node controlled by a local or remote processor able to manage this update.

It is also a second object of the invention to have this update performed with the best usability for network devices, such as a switching node, which must remain available in the network. These needs imply three constraints: in-site updating, this means updating without physically replacing a component of the device; on-line updating, this means updating without powering off all of the devices and with a minimal impact on the operational traffic in the network device; and remote updating, which means that this operation is remotely achieved through one line of the network device (telecommunication or local line).

The third object of the invention is to have a good price/performance ratio; this means minimizing the dedicated hardware implementation for the updating function, said hardware implementation coming in addition to the main functional part of the system.

It is a fourth object of the invention to protect the configuration data against unexpected events such as power off action or box reset at any point in time during the configuration updating process.

SUMMARY OF THE INVENTION

The present invention discloses a method to update at least one programmable piece of hardware logic (FPGA) loadable with a configuration data file, a first hardware logic having means for receiving and sending data under the control of a local or remote control means; said first hardware logic, when receiving said configuration data file, loading itself with said configuration data file and loading the other programmable logics of the series, if any, with said configuration data file; said method being for use with at least one non-volatile memory, accessible at any addressable location, where all the bits of a part of said memory must be flushed to a same binary value before being modified; said method being characterized in that it comprises the steps of:

organizing a non-volatile memory in at least two parts for storing at least two configuration data files one part containing a flag for identifying one of the configuration data files; said memory being initialized with at least one safe configuration data file and said flag being initialized with the value corresponding to the identification of said safe configuration data file;

at any time, upon reception from said control means of a demand for loading a new configuration data file in the programmable hardware logic, reading into the memory the value of the flag and pointing to the corresponding part of the memory for reading the configuration data file and sending it to the first hardware logic; and, upon reception of a demand of the first hardware logic, reading or writing any information data at an addressable location of said memory; or, when receiving from said first hardware logic a new configuration data file, reading the value of said flag and writing said configuration data file into another part of the memory than the one identified by the flag value.

The system implementing the steps of the method comprises a non-volatile memory, acting as a repository for the configuration data files and an intermediate logic controlling said memory. This system may be included in an adapter of a network device. The management of the different configuration data files is done via a flag which does not require a specific non-volatile storage as it is in the repository's non-volatile memory. The functional path of the FPGAs is used for transferring the configuration data files; therefore, no additional bus has been added for the FPGAs updating function. In using the functional path of the FPGAs, a specific value of the flag points to a safe configuration data file in order to insure safe loading of the FPGAs upon any unexpected event leading to an initialization.

DESCRIPTION OF THE DRAWINGS

FIG.7 depicts the detailed components of the configuration logic.

DESCRIPTION OF A PREFERRED EMBODIMENT OF THE INVENTION

The mode selected for FPGA loading is Serial mode in order to minimize the number of IO count needed for configuration loading. Moreover, between the two Serial modes, the Master Serial Mode has been chosen in order to avoid the external generation of EPROM control signals such as the "CCLK" clock.

The following reasons have lead to the choice of the repository memory technology: it is not possible to use a set of serial PROMs such as the 128 kbit XILINX XC17128 because the on-line download function requires that the repository memory can be erased and re-written, whereas PROMs are writable only one time; this makes the EEPROMs technology mandatory. Moreover, serial EEPROMs are currently limited in density and they are more expensive—at equivalent capacity —than versatile byte-wide EEPROMs. An example of high density serial EEPROM is the 16 kbit AT24C16 from ATMEL. A single byte-wide Flash EEPROM can be used instead of multiple serial EEPROMs. More than one single Flash EEPROM can be used instead of one unique Flash EEPROM.

In order to use the FPGAs in Master Serial Mode with the single byte-wide Flash EEPROM, an intermediate logic is necessary to serialize and deserialize data (1 bit for Lead FPGA, 8 bits for Flash EEPROM) and to generate the parallel address of the Flash EEPROM.

An implementation of this logic will be performed, for the preferred embodiment, with an EPLD (EPROM technology based complex Programmable Logic Device) which offers simpler software and more predictable timing than FPGAs. The intermediate logic is described later in FIGS. 7 and 8. Any other technology of integrated circuit can be used to implement the intermediate logic of the present invention.

Figure 1:
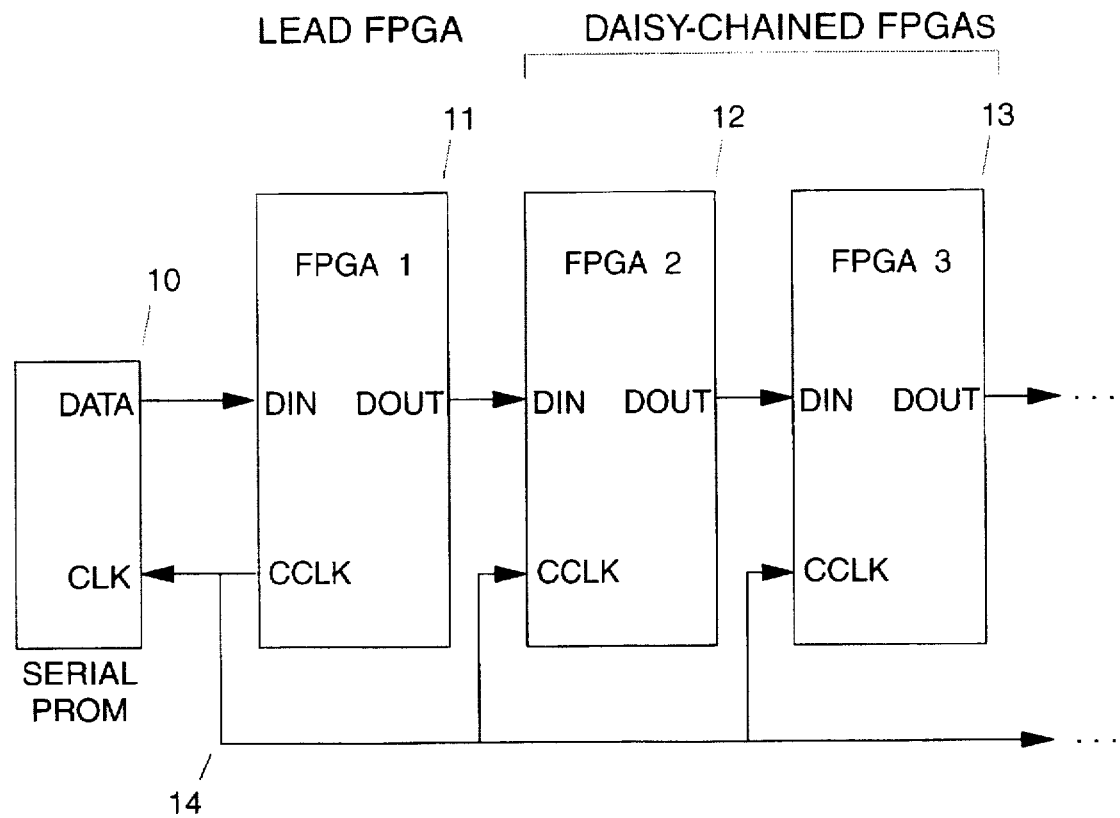
FIG.1 depicts the Master Serial Mode of the prior art
Figure 2:
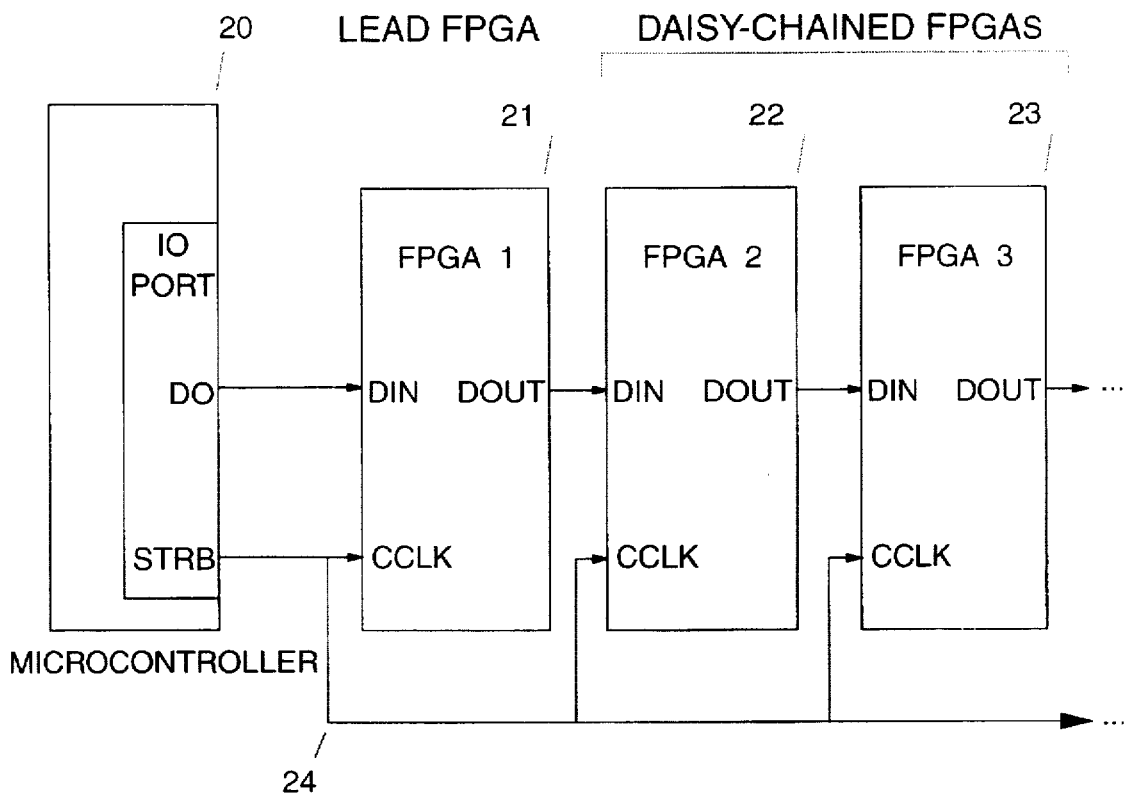
FIG.2 depicts the Slave Serial Mode of the prior art
Figure 3:
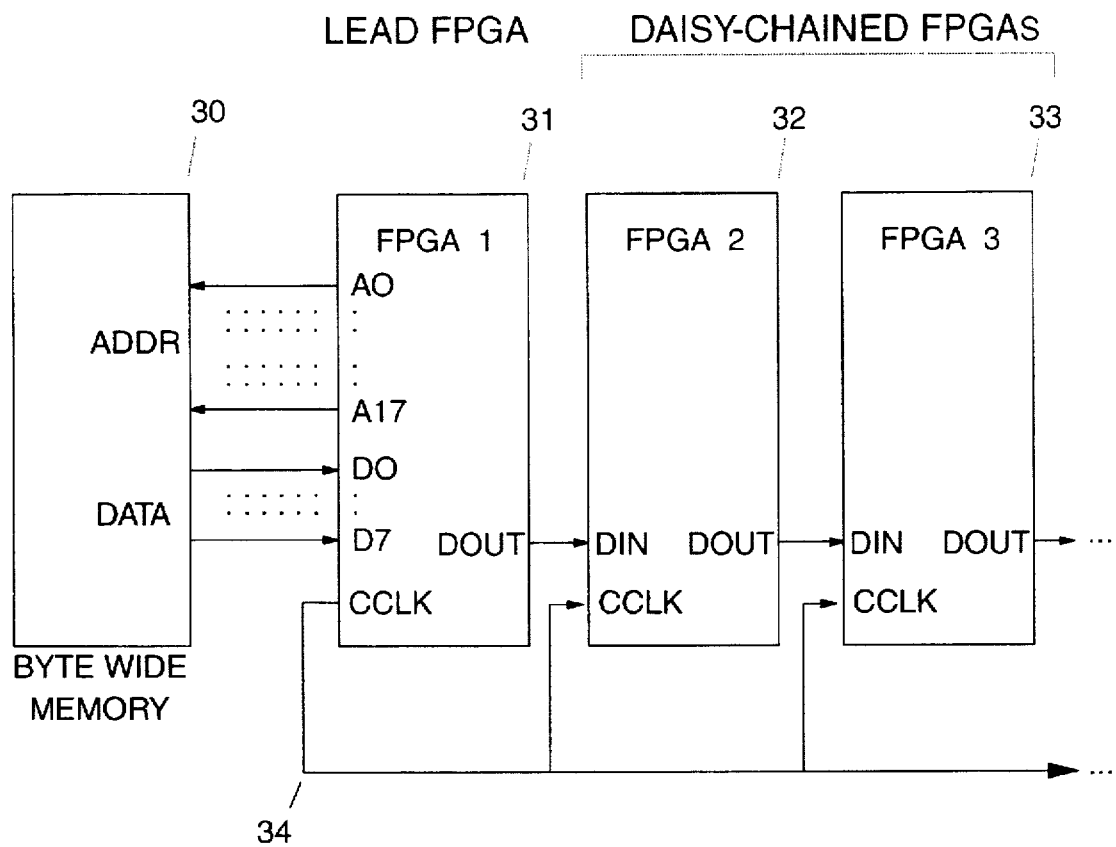
FIG.3 depicts the Master Parallel Mode of the prior art
Figure 4:
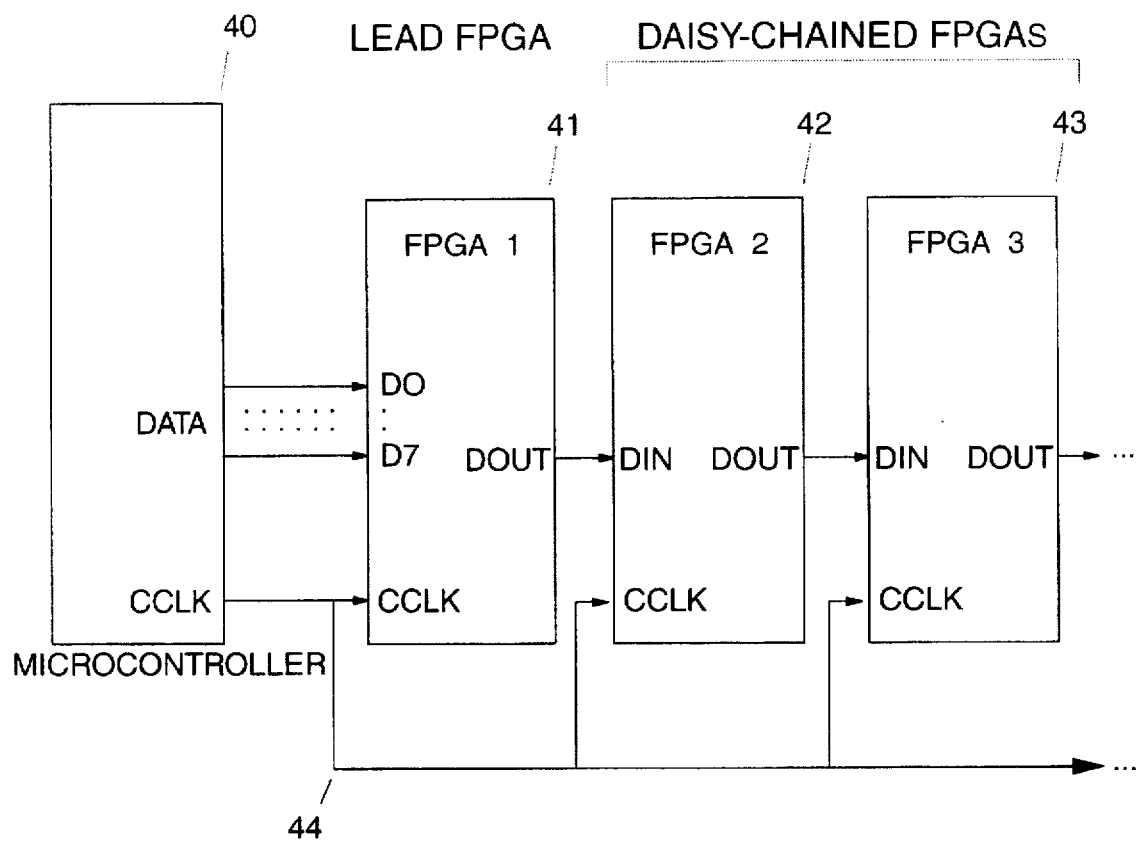
FIG.4 depicts the Slave Parallel Mode of the prior art
Figure 5:
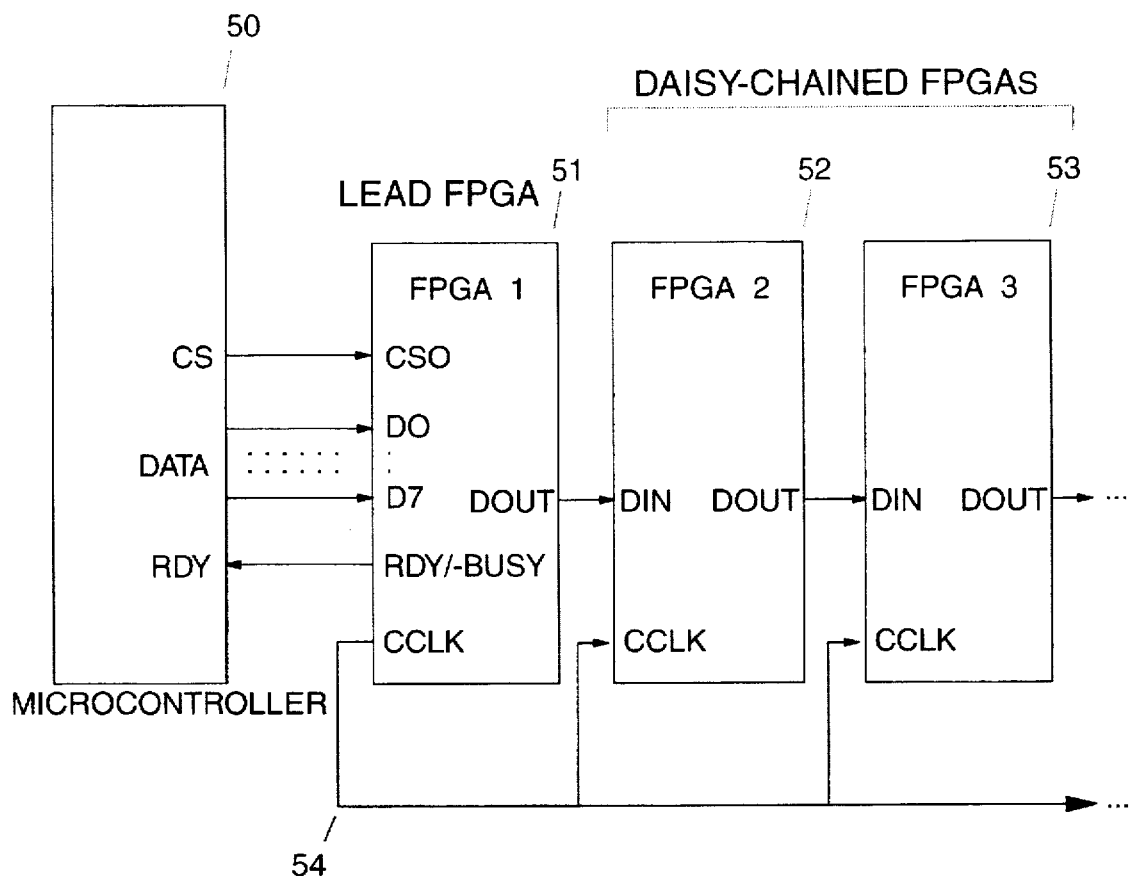
FIG.5 depicts the Asynchronous Peripheral Mode of the prior art
Figure 6:
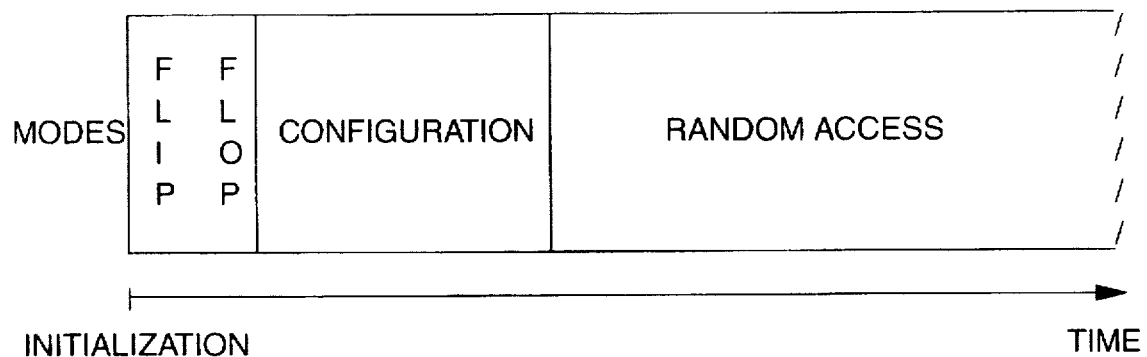
FIG.6 depicts the modes of operation of the Flash memory access.

FIG. 6 illustrates the three exclusive modes of operation of the intermediate logic. The event of initialization of the system which may occur at any time during any mode of operation of the intermediate logic, may be a Reset Push button, a power on reset or a network device reset. This initialization event may apply to different parts of the network device implementing the solution of the invention: for instance, the initialization event may occur on one adapter card of a switching node, this adapter card supporting only a limited number of network lines. The initialization triggers the FLIP/FLOP mode of operation: this mode consists of recognizing which of the stored FPGAs'configuration data files is the "active" configuration data set which has to be loaded into the FPGAs. In the present invention the repository Flash memory is structured in two "Flip" and "Flop" areas. This is to achieve a safe download of a new FPGA configuration. If the "active", configuration resides in the "Flip" area, the new configuration to be stored will be stored in the "Flop" area. If the "active" configuration resides in the "Flop" area, the new configuration to be stored will be stored in the "Flip" area. This short period of FLIP/FLOP mode is automatically followed by the configuration mode triggering. This mode consists of parallel data being read into the repository memory and serial data being written into the Lead FPGA. The configuration mode period is automatically followed by the Random Access mode triggering. During the period of the Random Access mode of operation, the intermediate logic reads or writes at any address in the repository Flash memory. The following functions are supported by the Random Access mode of operation:

download of new configuration (several writes)
    checking of download configuration data (several reads)
    switching of FLIP/FLOP bit (single write)
    capture of control information (several reads)
    storing of control information (several writes)

The detailed schematic of the EPLD intermediate logic is given in FIG. 7. The System Reset line 75 is activated at Power-on time or re-initialization time. It triggers the personalization of the FPGAs 72, 73, 74 (plus the FPGAs not represented in the figure) under the control of the EPLD 71. The intermediate logic EPLD 71 starts its operation when receiving the System Reset signal on its RST input. Its first mode of operation is the "Flip/Flop" mode which allows the EPLD 71 to read into the Flash memory 70 the value of the Flip/Flop Flag. This is done by presenting to Flash memory 70 the hexadecimal address 7FFFF and getting in return a data byte indicating the location where the Flip/Flop Flag bit is found.

The EPLD 71 proceeds under the "Configuration" mode of operation. It runs under the control of the CCLK clock signal provided by the Lead FPGA 72. The EPLD 71 presents incremental addresses to the Flash memory 70 which returns consecutive bytes of configuration data. Each byte of configuration data is serialized by the EPLD 71 and is given to the DIN input of the Lead FPGA 72. The Lead FPGA 72 forwards serial configuration data from its DOUT pin to the DIN pin of the first Slave FPGA 73. The first Slave FPGA 73 forwards serial configuration data from its DOUT pin to the DIN pin of the second Slave FPGA (not represented on the figure) and the same process applies until reaching the Slave FPGA 74 at the end of the daisy chain.

After configuration of all FPGAs, the EPLD 71 sets itself in "Random Access" mode. It is then driven by the Lead FPGA 72 which provides a Shift Clock to the SCLK input of the EPLD 71, serial data to the SDATA bidirectional pin of the EPLD 71, and a shift control signal to the SHIFT input of the EPLD 71. These signals are used by the EPLD 71 to read or write data into Flash Memory 70 upon request of the Lead FPGA 72.

Figure 8A:
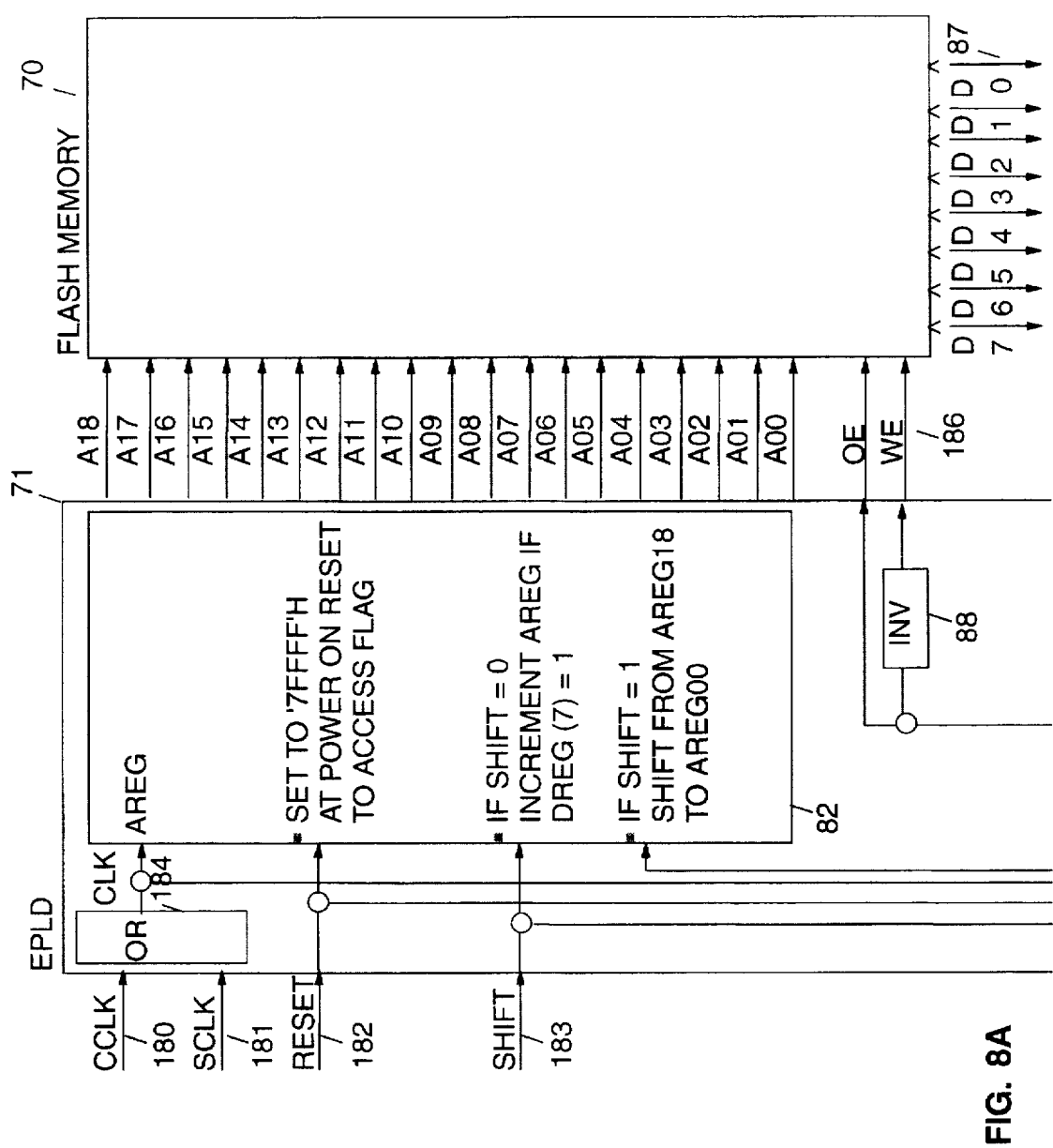
FIG.8 depicts the detailed components of the EPLD (EPROM Programmable Logic Device) logic.
Figure 8B:
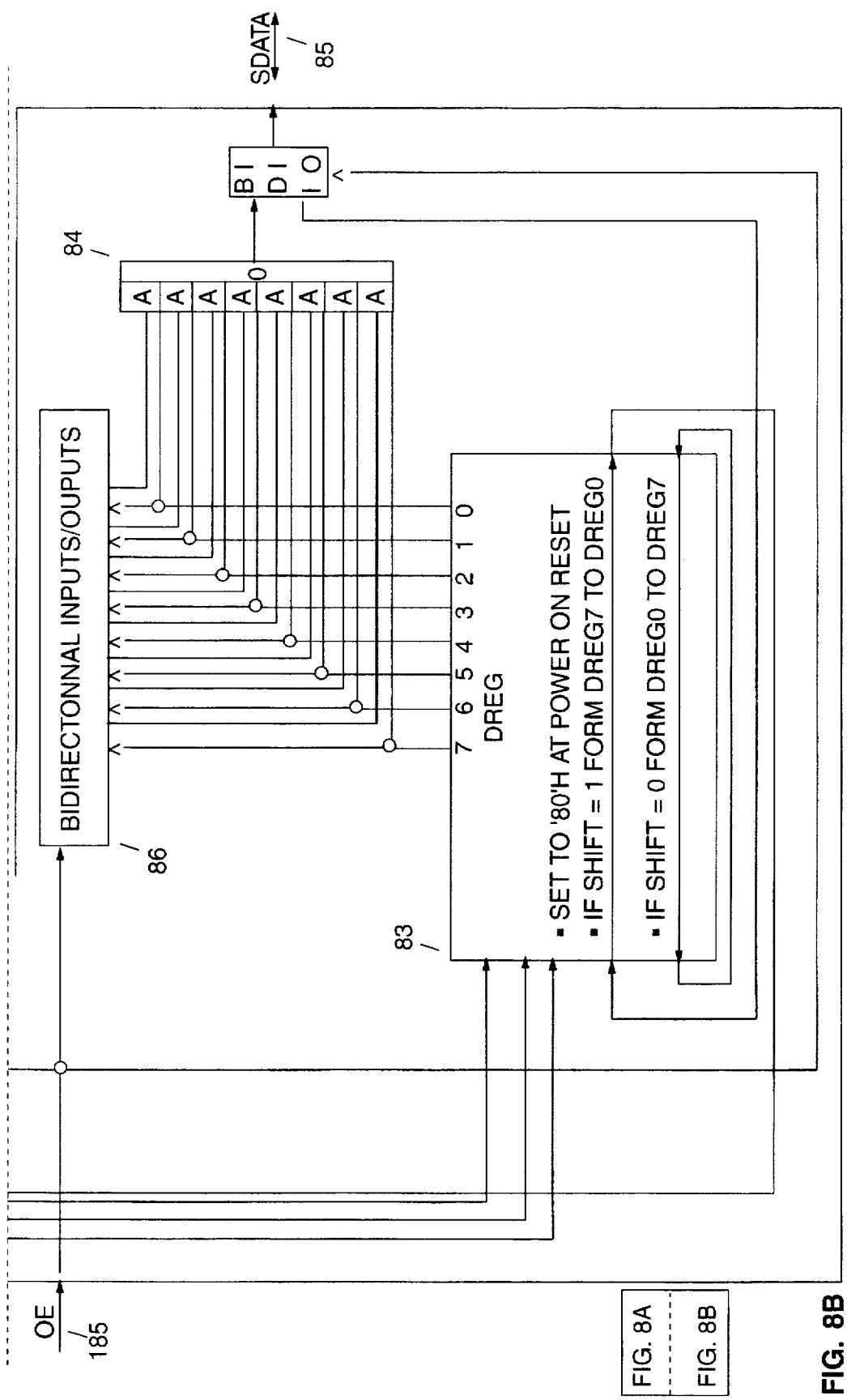

The detailed schematic of the EPLD intermediate logic is given in FIG. 8. The clocking of the EPLD 71 is done with signal CCLK 180 when in "Configuration" mode and with signal SCLK 181 during "Random Access" mode because the CCLK signal is a dedicated FPGA output that cannot be used for other purposes after configuration. The two signals are exclusive, in that the internal EPLD clock is provided by a single OR gate 184.

The AREG 82 is a 19 bit Address Register that holds the address sent to the Flash memory 70.

The DREG 83 is an 8 bit Data Register that is used to serialize data read out of the Flash memory 70 for read operations, and to hold data to be written into the Flash memory 70 for write operations.

Flip/Flop Mode:
    The flip/flop mode logic is started at power-on reset or upon system re-initialization by assertion of the RESET line 182 which resets the EPLD 71. The AREG 82 is preset to '7FFFF'h to read the last byte of the Flash memory where the Flip/Flop Flag is stored. The output of the data from the Flash memory 70 is enabled by the signal OE 185 which is active during Flip/Flop Mode. This bit is latched in the most significant bit (A18) of the AREG 82. The other bits of the AREG 82 are then incremented by one so that the AREG 82 has its next value equal to 'x000000000000000000'b where x is the value of the Flip/Flop Flag depending on the active configuration. The AREG 82 is now ready for running under the next mode (Configuration Mode).

At power-on reset or upon re-initialization, the DREG 83 is set to '10000000'b. This value allows the reading of the Flip/Flop Flag found in most significant position of the byte read at address '7FFFF'h by controlling the data multiplexer 84. Indeed, the DREG 83 acts as a register holding a mask to select one bit of data in the byte received by the EPLD 71 in its bidirectional I/Os 86.

Configuration Mode:
    When the first CCLK pulse is sent by the Lead FPGA to the EPLD 71 the DREG 83 is left-shifted. This left-shift operation makes the most significant bit of the DREG 83 wrap back onto its least significant bit. This allows the sending of the next bit of the active configuration data on the SDATA line 85 via the data multiplexer 84. After the next seven CCLK pulses, the value of the DREG 83 is '10000000'b. At this point, the AREG 82 is incremented by 1 to read the next byte in the Flash memory 70. This operation continues until the end of the FPGA configuration.

In Configuration Mode, the Output Enable signal OE 185 is held active to allow data output from the Flash memory 70.

Random Access Mode:

After configuration the CCLK signal 180 is no longer active. The Lead FPGA has to supply another clock to the EPLD 71; this clock is the SCLK signal 181.

Read Access :

To read the Flash memory 70 at a desired location the Lead FPGA has to shift the selected 19-bit address into the AREG 82 and shift the 8-bit data value '01'h into the DREG 83. This is achieved by asserting the SHIFT signal 27 SCLK cycles, 27 being the sum of 19 (for address bits) and 8 (for data bits). Then the SHIFT must reset to 0 and each subsequent SCLK cycle will allow to send a bit on SDATA via the data multiplexer 84. During Read Accesses, the Output Enable signal OE 185 is held active to allow data output from the Flash memory 70.

Write Access :

To write the Flash memory 81 at a desired location the Lead FPGA has to shift the selected 19-bit address into the AREG 82 and shift the 8-bit data value into the DREG 83. As for the read operation, the SHIFT signal must be asserted during 27 SCLK cycles.

Then SHIFT must be reset to 0 and the Write Enable signal WE 186 must be asserted. This is done by the Lead FPGA which negates the Output Enable signal 185 which is inverted by the gate INV 88.

Figure 9:
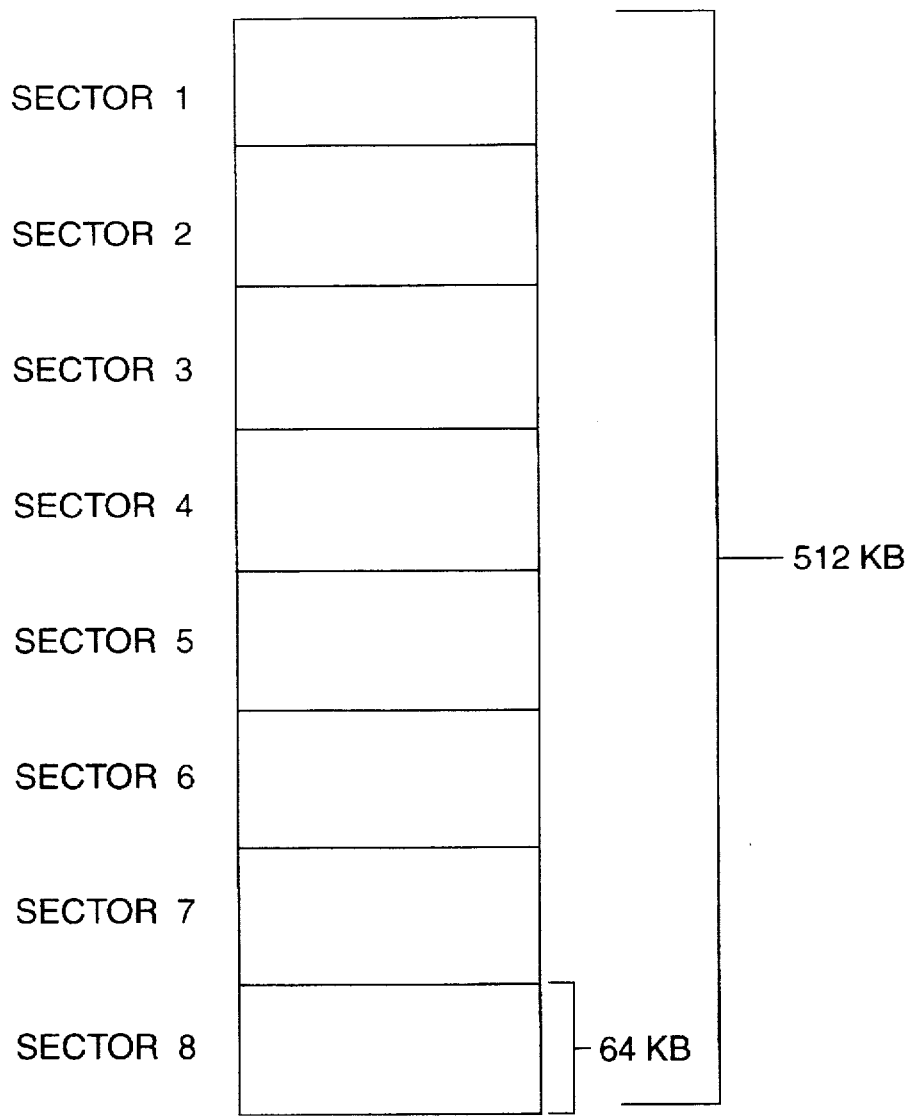
FIG.9 depicts the sectors of the Flash memory.

During Write Accesses, the DREG 83 acts as a data shift register, receiving a serial bit stream from SDATA line 85, and presenting it as a parallel byte to the Flash memory 70 via the Data Bus 87. As illustrated in FIG. 9, the 512 kByte memory space of the 29F040 Flash EEPROM of the preferred embodiment is divided in 8 sectors of 64 kBytes each. This provides security for data when accessing the Flash memory. Indeed, due to the Flash technology, a data bit '0' can be written over an existing value of '1', but a data bit '1' cannot be written over an existing value of '0'. Thus, to be able to write any data value in some memory space, this space must be preset to all ones. This is the purpose of the segmentation of the Flash memory in eight sectors: it allows the flushing of only 64 kB —not the full memory space— when data is to be written.

The concatenation of the configuration files for the nine FPGAs in the preferred embodiment calls for an area of 242379 bytes for each of the Flip and Flop sides.

Figure 10:
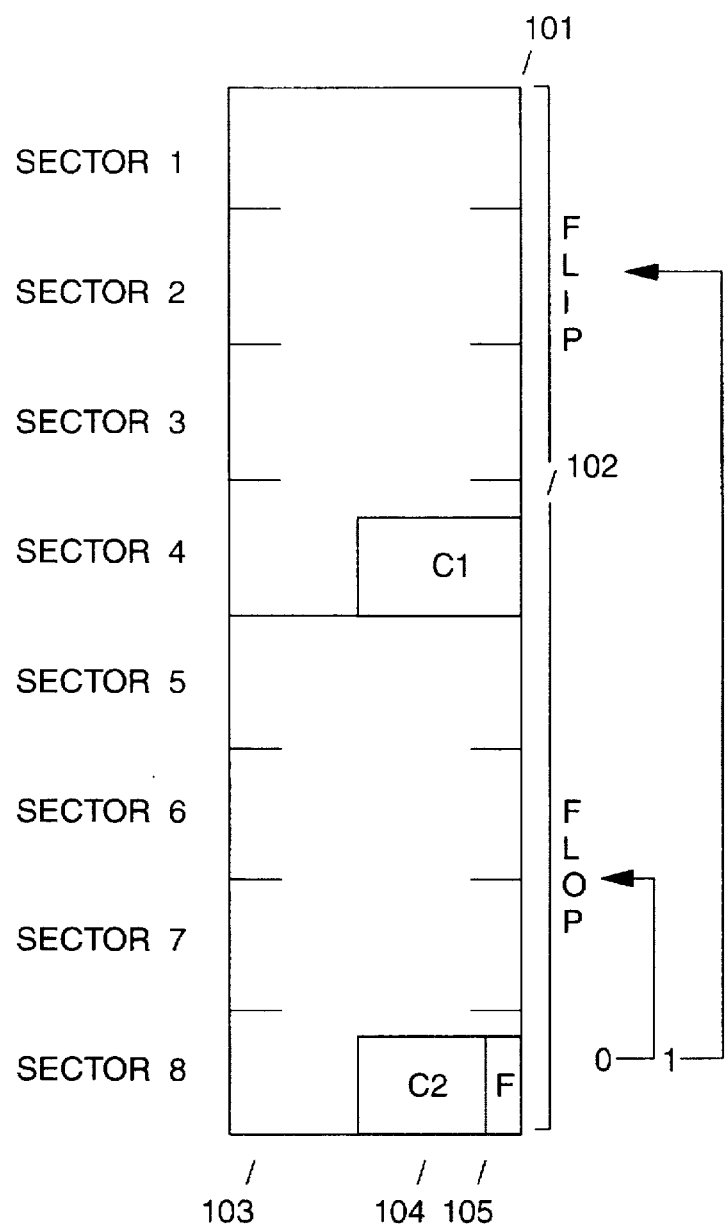
FIG.10 depicts the Flash memory map.

Then, as depicted in FIG. 10 which represents the memory map applied to the most demanding concentration card containing nine FPGAs, the Flip side 101 is mapped in sectors 1, 2, 3, 4 and the Flop side 103 is mapped in sectors 5, 6, 7, 8, without filling them completely.

The remaining space of the Flip side (field "C1" 102) is available to store additional information related or not related to the configuration data of the Flip area 101. Examples of such information are the Part Number of the card and the Level Number of the FPGA configuration data. In the preferred embodiment, the size of C1 is: 262144−242379=19765 bytes A similar area exist beside the Flop area (field "C2" 104). Its size is equal to size of C1 minus one byte which is used for holding the single bit Flip/Flop Flag (field "F" 105). The encoding of the Flip/Flop Flag in the preferred embodiment is:

0: points to the Flop side

1: points to the Flip side

This leads to maximum security when the Flash memory is updated.

If the active configuration resides in the Flip side, F is equal to 1, and a new configuration data to be downloaded is to be written in Flop side. This is achieved by:

1. Flushing the complete Flop area to all ones (erase sectors 5, 6, 7, 8). This also causes the "C2" and "F" fields to be flushed to one, which does not change anything on the Flip/Flop Flag "F" which was already set to 1.

2. Write successively all the bytes of the new configuration in the Flop area, followed by additional information in the "C2" field.

After updating the Flop area with new configuration and additional data, it is completely read and checked by centralized software against reference data. Then, at any later time, this new configuration can be declared as the "active" configuration by changing the value of the Flip/Flop Flag from 1 to 0, making it point to the Flop side. This change of Flip/Flop Flag does not require any memory flush because it is a legal write of 0 over 1.

If the active configuration resides in the Flop side, F is equal to 0, and new configuration data to be downloaded is to be written in Flip side. This is achieved by:

1. Flushing the complete Flip area to all ones (erase sectors 1, 2, 3, 4). This also causes the "C1" field to be flushed to one.

2. Write successively all the bytes of the new configuration in the Flip area, followed by additional information in the "C1" field.

After updating the Flip area with new configuration and additional data, it is completely read and checked by centralized software against reference data. Then, at any later time, this new configuration can be declared as the "active" configuration by changing the value of the Flip/Flop Flag from 0 to 1, making it point to the Flip side. This change of Flip/Flop Flag is made through a flush of sector 8 in which the "F" field resides, because a 1 cannot be written over a 0. This update of the Flip/Flop Flag is immediately followed by the rewriting of all data which has been lost when flushing sector 8. This permits regeneration of the now "previous" configuration data, so that a step back from "active" to "previous" configuration is possible.

More than one configuration data file may be stored in the Flash EEPROM repository memory. In this case, the FLIP/FLOP flag is more than one bit long. In order to insure the same security in case an unexpected event leading to an initialization occurs during the update of the configuration file containing the flag, the value of the flag having all bits set to the binary value flushed before writing has to identify a valid configuration data file stored in the Flash memory. The flag should also identify a valid configuration data file stored in the Flash memory to insure security during the update of the flag itself in the repository Flash memory.

The mechanism demonstrated in the preferred embodiment to write, flush and read the Flash memory areas is based on Guided cells whose concept is described in co-pending patent application "Efficient Hardware/Software Interface for a Data Switch" U.S. patent application Ser. No. 08/547,825 filed Oct. 25, 1995, pending. One skilled in the art would recognize solutions in addition to guided cells. Guided cells provide an internal path used by centralized software running in a single card of the network device to access hardware resources in all the cards of the network device. The internal path is "in-band", i.e. information transmitted between card hardware and centralized software is carried in the same way as functional traffic. In the present invention no physical or logic specific path has been dedicated to the FPGA updating function: due to the fact that the download uses the same path as the functional traffic, the FPGAs must absolutely be prevented from being initialized with corrupted configuration data, otherwise the functional path is destroyed and it will be impossible to ever download valid configuration information.

The new FPGA's configuration will actually be effective after the next system initialization (Power-on or Software initiated reset) where configuration data will be physically transferred from Flash memory to the FPGAs.

The update scheme provides maximum safety, since the Flip/Flop Flag is updated in a single operation (write or flush) after complete checking of the newly downloaded data. This provides resistance to error cases, such as power-down, during the download:

Assuming that the active configuration is in the Flop area, and the new configuration is downloaded in the Flip area, if power fails during downloading, the Flip/Flop Flag has not been switched from 0 to 1, then the FPGAs will be re-initialized with the active Flop configuration when power is restored.

Assuming that the active configuration is in the Flip area, and the new configuration is downloaded in the Flop area, if power fails during downloading, the Flip/Flop Flag is necessarily set to 1 because of the sector 8 erase, then the FPGAs will be reinitialized with the active Flip configuration when power is restored.

This scheme allows partial updates of configuration or control data, by limiting the memory flushes and writes to 1, 2 or 3 sectors instead of 4. This is useful when a hardware upgrade relates to the update of a single FPGA whose configuration data is fully contained in a single Flash sector.

We claim:

1. A method of updating configuration information in a programmable hardware logic device during operation of said logic device, said logic device having means for receiving first data and means for sending second data under control of a local or remote control means, said method comprising the steps of:

using an external non-volatile memory, said memory organized into a plurality of parts, each of said parts comprising one or more sections, each of said sections comprising a plurality of bits, and wherein modification of any of said bits in a selected section requires flushing all of said plurality of bits in said selected section to a same binary value;

storing a plurality of configuration data files in said memory, wherein one of said configuration data files is characterized as a safe configuration data file:

using an external device for controlling said memory and for transferring data between said memory and said logic device;

storing a flag in one of said parts of said memory, wherein said flag is comprised of one or more of said plurality of bits and identifies one of said plurality of configuration data files;

initializing said memory to store said safe configuration data file;

initializing said flag to identify said safe configuration data file;

receiving from said control means a demand for loading, and in response to said demand, using said flag to locate one of said plurality of configuration data files and sending said located configuration data file to said logic device;

receiving said located configuration data file in said logic device under control of said control means;

updating said configuration information after receiving said located configuration data file;

selectively modifying said flag to identify said new configuration data file as said safe configuration data file after said new configuration data file has been safely loaded;

sending a new configuration data file from said logic device to said external device under control of said control means; and receiving said new file from said logic device, and storing said new file as one of said plurality of configuration data files in one of said parts, wherein said one part is different from the part in which said safe configuration data file is stored.

2. The method of claim 1, wherein said memory is further characterized by having a plurality of addressable locations, said method further comprising the steps of:

sending a demand from said logic device to said external device under control of said control means, wherein said demand may be a first demand for reading or a second demand for writing;

sending an address from said logic device to said external device under control of said control means, wherein said address may be a first address or a second address;

sending first data from said logic device to said external device under control of said control means;

receiving second data in said logic device under control of said control means, wherein said second data may be operating data or any of said configuration data files;

receiving said first demand for reading;

receiving said first address from said logic device after receiving said first demand, and in response, retrieving said second data from said first address and sending said second data to said logic device, wherein said first address identifies one of said plurality of addressable locations;

receiving said second demand for writing;

receiving said second address from said logic device after receiving said second demand; and receiving said first data after receiving said second address, and in response, storing said first data at said second address, wherein said second address identifies one of said plurality of addressable locations.

3. The method of claim 1 or 2, wherein said flag identifies said safe configuration data file when all of said one or more bits is set to said same binary value.

4. The method of claim 1 or 2, wherein said memory is organized into two parts, each of said parts containing a single configuration data file, wherein said flag comprises a single bit in one of said sections of a first of said two parts, and when said flag is set to said binary value, said flag identifies the configuration data file in a second of said two parts.

5. The method of claim 1 or 2, further comprising the step of storing non-configuration data in said memory.

6. The method of claim 4, wherein said flag, when set to said binary value, identifies said safe configuration data file.

7. The method of claim 2, wherein said flag is stored at one of said plurality of addressable locations, and when said flag is to be sent or received by said external device, said first address or said second address, respectively, identifies said location at which said flag is stored.

8. The method of claim 7, wherein said flag, when set to said binary value, identifies said safe configuration data file.

9. The method of claim 5, wherein said flag, when set to said binary value, identifies said safe configuration data file.

10. A system for updating configuration information in a programmable hardware logic device during operation of said logic device, comprising:

an external non-volatile memory, said memory organized into a plurality of parts, each of said parts comprising one or more sections, each of said sections comprising a plurality of bits, and wherein modification of any of said bits in a selected section requires flushing all of said plurality of bits in said selected section to a same binary value;

a plurality of configuration data files stored in said memory, wherein one of said configuration data files is characterized as a safe configuration data file;

an external device for controlling said memory and for transferring data between said memory and said logic device;

a flag stored in one of said parts of said memory, wherein said flag is comprised of one or more of said plurality of bits and identifies one of said plurality of configuration data files;

means in said external device for receiving a demand for loading from a local or remote control means, and in response to said demand, using said flag to locate one of said plurality of configuration data files and sending said located configuration data file to said logic device;

means in said logic device for receiving said located configuration data file under control of said control means;

means in said logic device for updating said configuration information after receiving said located configuration data file;

means in said logic device for sending a new configuration data file to said external device under control of said control means;

means in said external device for receiving said new file from said logic device, and storing said new file as one of said plurality of configuration data files in one of said parts, wherein said one part is different from the part in which said safe configuration data file is stored;

means for initializing said memory to store said safe configuration data file;

means for initializing said flag to identify said safe configuration data file; and means for selectively modifying said flag to identify said new configuration data file as said safe configuration data file.

11. The system of claim 10, wherein said memory is further characterized by having a plurality of addressable locations, said system further comprising:

means in said logic device for sending a demand to said external device under control of said control means, wherein said demand may be a first demand for reading or a second demand for writing;

means in said logic device for sending an address to said external device under control of said control means, wherein said address may be a first address or a second address;

means in said logic device for sending first data to said external device under control of said control means;

means in said logic device for receiving second data from said external device under control of said control means, wherein said second data may be operating data or any of said configuration data files;

means in said external device for receiving said first demand for reading;

means for receiving said first address from said logic device after receiving said first demand, and in response, retrieving said second data from said first address and sending said second data to said logic device, wherein said first address identifies one of said plurality of addressable locations;

means in said external device for receiving said second demand for writing;

means for receiving said second address from said logic device after receiving said second demand; and means for receiving said first data after receiving said second address, and in response, storing said first data at said second address, wherein said second address identifies one of said plurality of addressable locations.

12. The system of claim 10 or 11, wherein said flag identifies said safe configuration data file when all of said one or more bits is set to said same binary value.

13. The system of claim 10 wherein said logic device is characterized as a lead logic device, said system further comprising:

at least one slave programmable hardware logic device, wherein all of said slave logic devices are connected in serial mode and a first of said at least one slave logic devices is connected to said lead logic device in serial mode; and means for propagating said located configuration data file in serial mode from said lead logic device to said first slave logic device, and from said first slave logic device to any other of said connected slave logic devices beyond said first slave logic device.

\* \* \* \* \*